(12) United States Patent
Narayanan et al.

(10) Patent No.: US 9,036,980 B2
(45) Date of Patent: May 19, 2015

(54) METHODS FOR EFFICIENTLY COMBINING PARTIAL ABR RECORDINGS

(75) Inventors: Ashok Narayanan, Lexington, MA (US); Atif Faheem, Nashua, NH (US)

(73) Assignee: Cisco Technology, Inc., San Jose, CA (US)

( * ) Notice: Subject to any disclaimer, the term of this patent is extended or adjusted under 35 U.S.C. 154(b) by 336 days.

(21) Appl. No.: 13/477,297

(22) Filed: May 22, 2012

(65) Prior Publication Data

US 2013/0315567 A1 Nov. 28, 2013

(51) Int. Cl.
| | |
|---|---|
| *H04N 5/94* | (2006.01) |
| *H04N 21/231* | (2011.01) |
| *H04N 5/91* | (2006.01) |
| *G11B 27/034* | (2006.01) |
| *G11B 27/10* | (2006.01) |
| *H04N 21/24* | (2011.01) |
| *H04N 21/845* | (2011.01) |
| *H04N 5/765* | (2006.01) |

(52) U.S. Cl.
CPC .......... *H04N 21/23116* (2013.01); *H04N 5/765* (2013.01); *H04N 5/91* (2013.01); *G11B 27/034* (2013.01); *G11B 27/105* (2013.01); *H04N 21/2404* (2013.01); *H04N 21/8456* (2013.01)

(58) Field of Classification Search
None
See application file for complete search history.

(56) References Cited

U.S. PATENT DOCUMENTS

| | | | |
|---|---|---|---|
| 7,526,787 B1 * | 4/2009 | Williamson et al. | 725/58 |
| 2008/0141309 A1 * | 6/2008 | Barsness | 725/58 |

* cited by examiner

*Primary Examiner* — William C Vaughn, Jr.
*Assistant Examiner* — Daniel Tekle
(74) *Attorney, Agent, or Firm* — Merchant & Gould

(57) ABSTRACT

Recording reconstruction from multiple overlapping recordings may be provided. New recorders may copy manifests from working recorders, as opposed to reconstructing from failed recorders, to construct manifests that refer to video fragments from different recorders. Origin servers may follow these reconstructed manifests to obtain any fragment in the recording, in any combination of recorder failure/takeover/restart, as long as there was at least one recorder functioning at all times.

24 Claims, 5 Drawing Sheets

METHODS FOR EFFICIENTLY COMBINING PARTIAL ABR RECORDINGS

BACKGROUND

Adaptive bitrate (ABR) streaming is used in streaming multimedia over computer networks. While in the past most video streaming technologies utilized streaming protocols such Real-time Transport Protocol (RTP) with Real Time Streaming Protocol (RTSP), adaptive streaming technologies are almost exclusively based on Hypertext Transfer Protocol (HTTP) and designed to work efficiently over large distributed HTTP networks such as the Internet. ABR streaming detects a user's bandwidth and central processing unit (CPU) capacity in real time and then adjusts video stream quality accordingly. An encoder is used in ABR streaming that can encode a single source video at multiple bit rates. A player client switches between streaming the different encodings depending on available resources.

BRIEF DESCRIPTION OF THE DRAWINGS

The accompanying drawings, which are incorporated in and constitute a part of this disclosure, illustrate various embodiments of the present disclosure. In the drawings.

DETAILED DESCRIPTION

Overview

Figure 1:
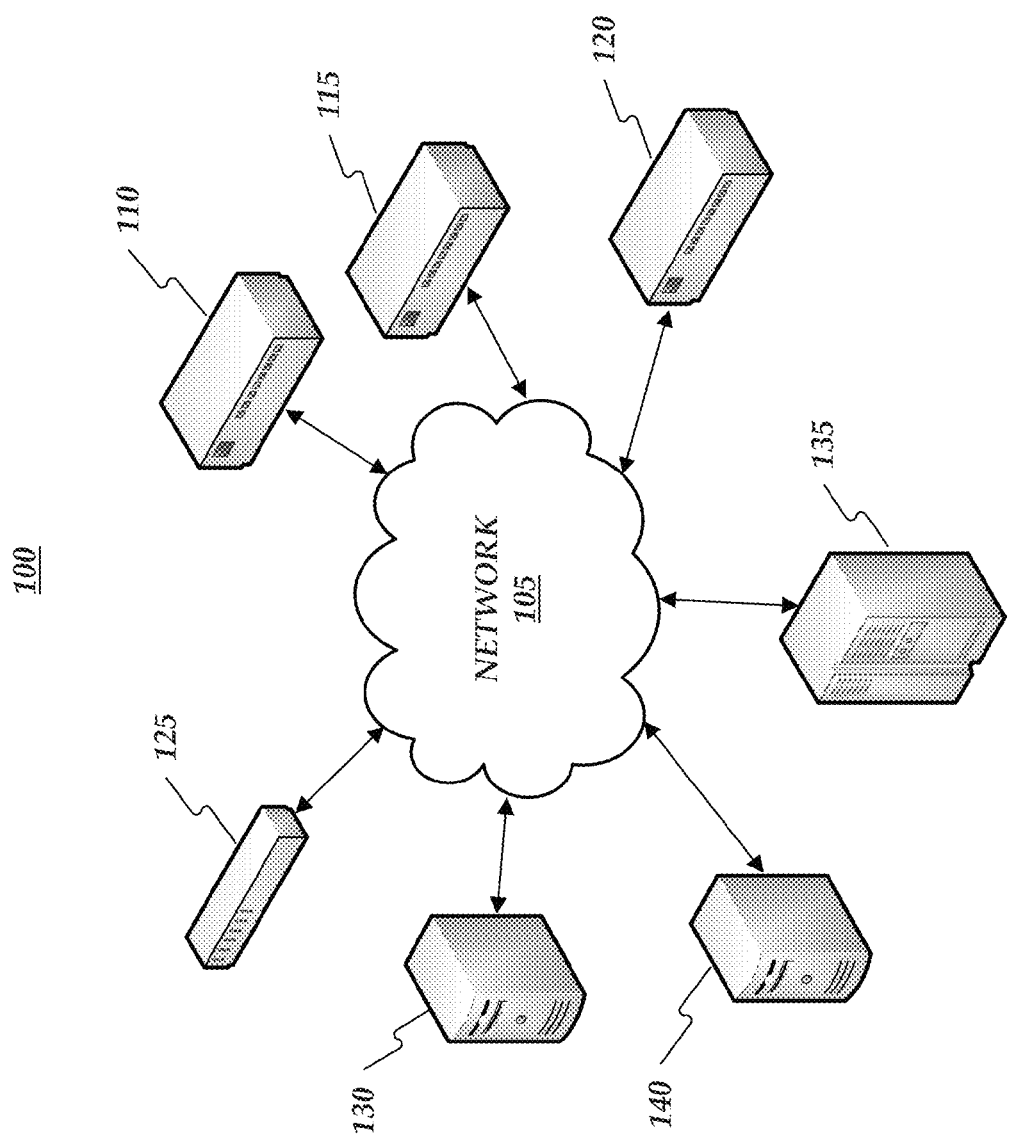
FIG. 1 shows an operating environment.

Recording reconstruction from multiple overlapping recordings may be provided. New recorders may copy manifests from working recorders, as opposed to reconstructing from failed recorders, to construct manifests that refer to video fragments from different recorders. Origin servers may follow these reconstructed manifests to obtain any fragment in the recording, in any combination of recorder failure/takeover/restart, as long as there was at least one recorder functioning at all times.

Both the foregoing overview and the following example embodiment are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the example embodiment.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

ABR streaming is used in streaming multimedia over computer networks. One part of an ABR video architecture is the encapsulation and recording of ABR video to servers that can then be delivered to clients. Redundant recording and encapsulation may be used so that system failures do not cause data loss. Because programs (i.e. content) can last a long time (e.g. 3+ hours), the system may need to be architected for more than a single failure over that time. If a program is encapsulated and/or recorded by two recorders, if a single recorder fails and then restarts (or the task is assigned to a different server), the new recorder may need to stitch together a complete copy of the program including any part that was missed during the failover. For long programs, multiple failures may occur, which means it cannot be guaranteed that a single recorder ever records a complete program end-to-end, yet a complete copy should be produced. Further, the aforementioned may apply for live programs, which means end-of-recording post processing may not be relied on.

Consistent with embodiments of the disclosure, the system may stitch together a valid copy of an ABR recording from multiple overlapping invalid copies, for example, by combining together functionality in a recorder and an origin server (e.g. a content server). It may take advantage of the ABR video's use of an external index (e.g. a manifest file) to reference fragments of video that can be stored in a single file or multiple files.

Consider two recorders A and B recording a program into, for example, two directories on a shared Network Attached Storage (NAS). Each recorder may create a manifest file and video data files with chunks. If recorder A fails, after a short time recorder C may be assigned to pick up the recording. Instead of trying to reconstruct A's recording, C may leave it on the NAS, and instead attempt to join the recording from B. C may start a new manifest with two parts. The first part may copy B's manifest, updating the copy to refer to the relative path of B's video data files. The second part may be a new period created by C as it starts the recording. The video data files generated by B may remain on the NAS. However, the current manifests (generated by A and C) may or may not refer to any data in these files. Note that at this point, A may also fail and restart (or hand the recording off to D). In this case, when D starts up, it may build the first part of its manifest from C's running manifest. This manifest may also refer to video data recorded by A, which is still retained on the NAS and may be available to serve. The result may be a set of manifest files that reference video fragments scattered across a set of recording files from multiple recorders. Note that although the manifests refer to incomplete video chunks, the manifests themselves may be complete.

The origin server(s) delivering this content may now dynamically stitch together the correct copy of data. When an origin server receives a request for a video chunk from a specific program, it may select any complete manifest of all the candidates in the system using any scheme. One way is to select the newest manifest of all candidates (if two recorders are running at the end, their manifests will be close together in time, but equivalent—so the recorder may pick either one). The manifest may reference video fragments scattered across all the recordings. Note that the origin server may not need to ever look at the video, or make a decision on which branch to follow. Each manifest may only have a single path from the newest fragment to the oldest one, although the paths from different manifests may cross and then diverge.

Furthermore, embodiments of the disclosure may handle non-shared storage. Here, the manifest may include information about the server who hosts any given period of the video (perhaps by recorders writing their own URLs in the period header). When a new server picks up a recording, it retrieves a copy of the latest manifest from the other recorder currently operating, and appends its own recording period to it. The result may be a manifest with multiple periods, each of which references the server who hosts the data for that period. Note that any given server cannot be relied on to host data permanently. So recorder C, which takes over for recorder A, may begin a background copy of all the referred data from the partial recording from recorder B. When the copy is completed, the manifest may then be updated.

Note that the non-shared storage scheme can also be used to avoid copying the manifest entirely by simply hyperlinking from the start of the new manifest to the last fragment of the manifest of the other recorder. The origin server may now follow the chain of links starting from the newest fragment of the newest manifest, up through the linked manifests until it locates the fragment in question. This scheme may further reduce the load on the recorder, but may shift more work to the origin server.

FIG. 1 is a block diagram of an operating environment 100. As shown in FIG. 1, operating environment 100 may include a network 105, a primary recorder 110, a secondary recorder 115, and a tertiary recorder 120. In addition, operating environment 100 may include captive controller 125, a content server 130, a network-attached storage (NAS) 135, and a client 140. Captive controller 125 may be configured to control primary recorder 110, secondary recorder 115, and tertiary recorder 120 as they record content from a content source and save the content to NAS 135. When client 140 requests content from content server 130, content server 130 may dynamically stitching together a correct copy of the content from data chunks stored on NAS 135 by any one or more of primary recorder 110, secondary recorder 115, and tertiary recorder 120. The content may comprise a data file that may comprise video and/or audio data such as web data object requests. Notwithstanding, the content may comprise any type of data. Network 105 may comprise any type of network (e.g. the Internet, a content delivery network (CDN), etc.) capable of transporting content. NAS 135 may comprise a file-level computer data storage connected to a computer network (e.g. network 105) providing data access to heterogeneous clients (e.g. primary recorder 110, secondary recorder 115, tertiary recorder 120, captive controller 125, content server 130, and a client 140.)

Figure 2:
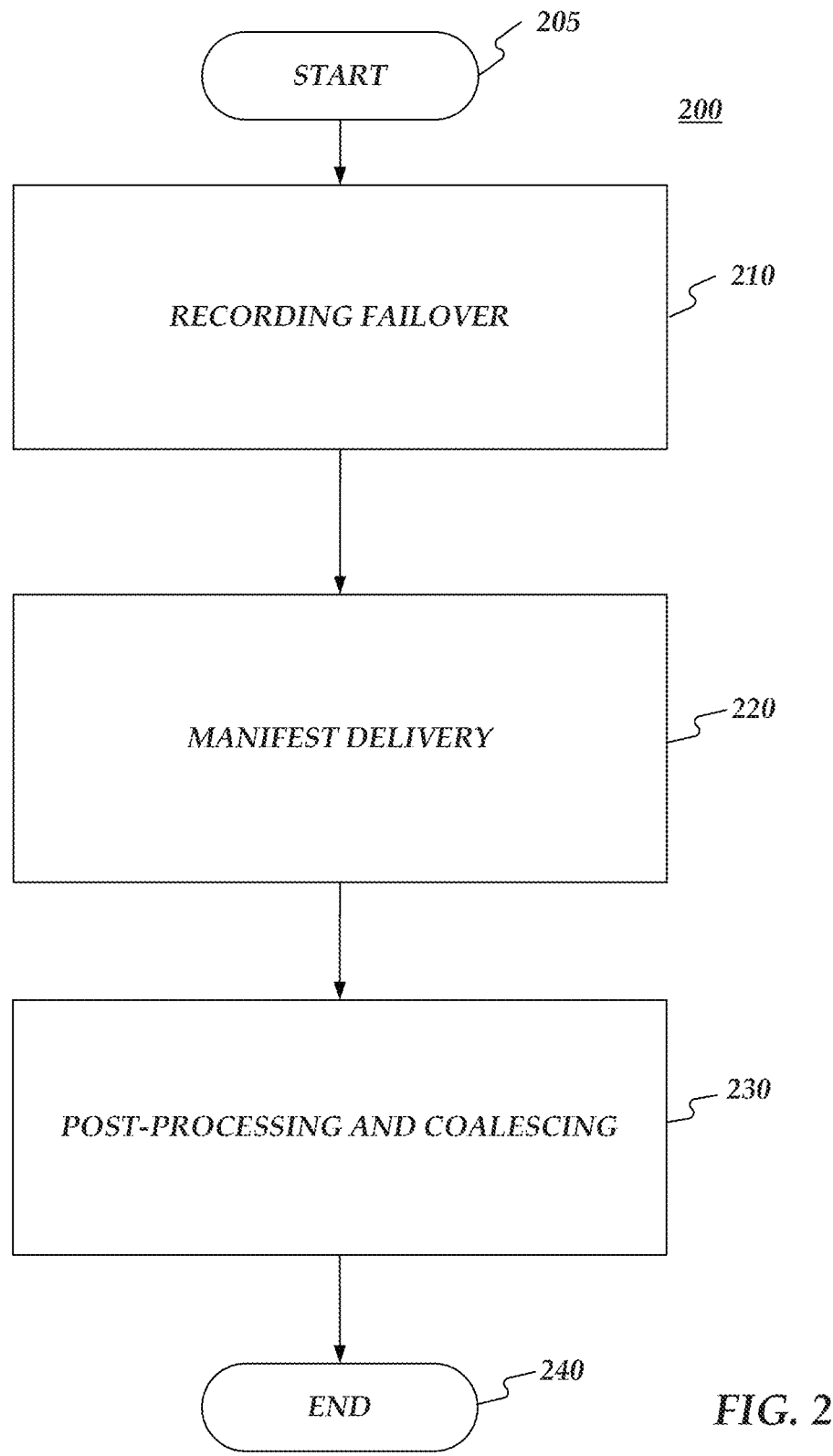
FIG. 2 is a flow chart of a method for combining partial recordings.

FIG. 2 is a flow chart setting forth the general stages involved in a method 200 consistent with an embodiment of the disclosure for combining partial recordings. Method 200 may be implemented using a computing device 500 as described in more detail below with respect to FIG. 5. Ways to implement the stages of method 200 will be described in greater detail below.

Figure 3:
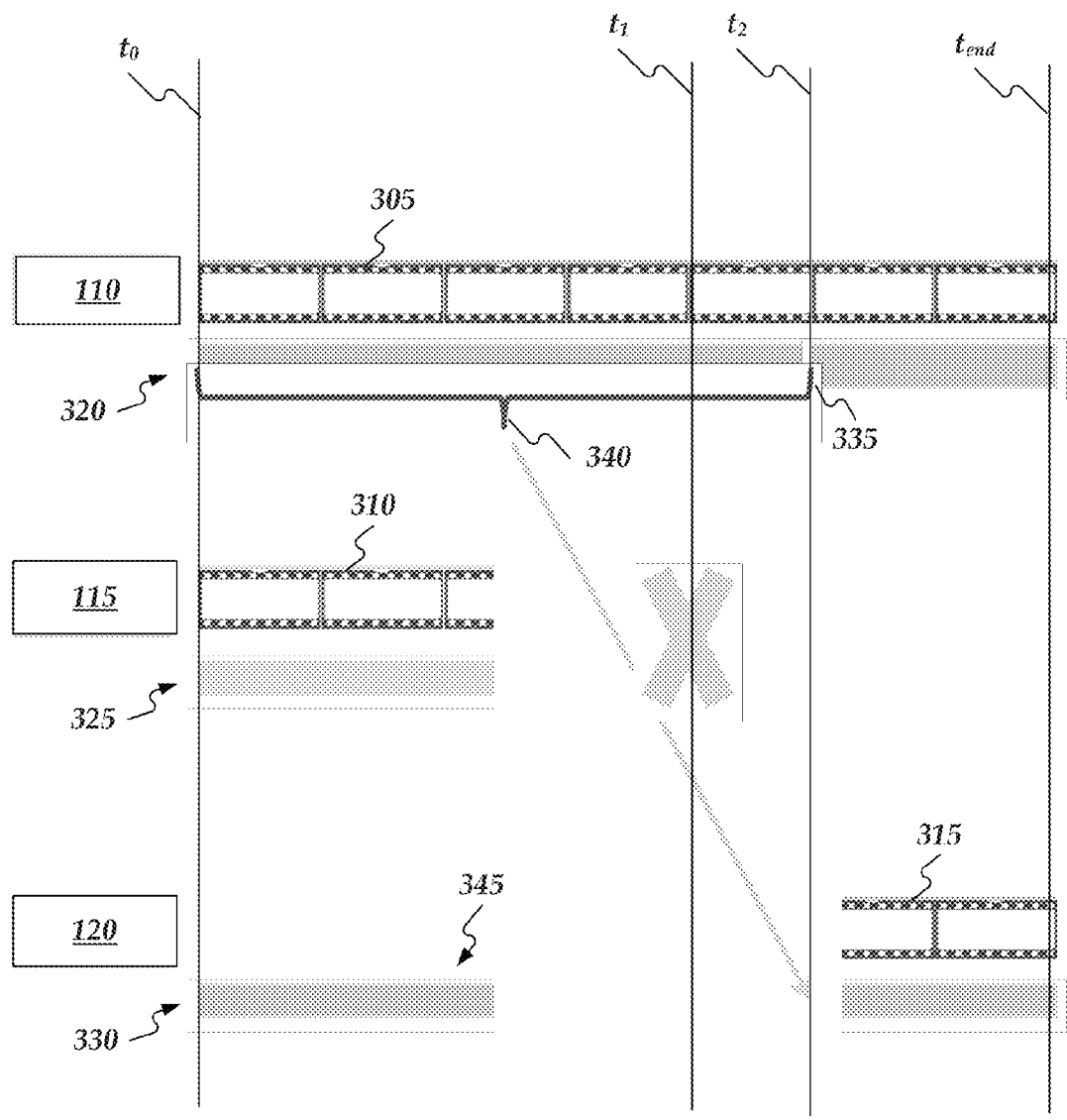
FIG. 3 shows recording failover.

Method 200 may begin at starting block 205 and proceed to stage 210 where captive controller 125 may detect and manage failover. FIG. 3 shows recording failover where tertiary recorder 120 takes over for secondary recorder 115 after secondary recorder 115 fails when captive controller 125 started a recording with primary recorder 110 and secondary recorder 115. FIG. 3 shows the progression in time of the different recorders of FIG. 1 as they are recording a program (i.e. content.) In FIG. 3, a first filmstrip 305, a second filmstrip 310, and a third filmstrip 315 represent indexed video for each respective recorder and a first solid line 320, a second solid line 325, and a third solid line 330 represent a manifest for each respective recorder.

In the example shown in FIG. 3, when secondary recorder 115 fails, this is detected by capture controller 125. Capture controller 125 then signals tertiary recorder 120 to take over and informs tertiary recorder 120 that primary recorder 110 is the other recording recorder. At this point, tertiary recorder 120 retrieves a copy 340 of the manifest from primary recorder 110 and prepends it to its own new manifest 345. Tertiary recorder 120 then starts recording new segments and appending it to a new period in its own manifest. Primary recorder 110 may also insert a period boundary 335 at the same point in time.

In the FIG. 3 example, the program recoding may be started at time $t_0$ and may be recorded in 2-second segments and saved to NAS 135. For example, 50 minutes after the start of the program recording (i.e. 3,000 seconds), secondary recorder 115 may fail at time $t_1$. After 45 seconds, for example, this failure may be detected by capture controller 125. In response, capture controller 125 may assign tertiary recorder 120 to take over the recording for the failed secondary recorder 115. By the time tertiary recorder 120 has taken over for failed secondary recorder 115 and is ready to record, 60 seconds further may have elapsed since $t_1$. By this time, primary recorder 110 has recorded 51 minutes of the program (i.e. 1,530 segments.) Tertiary recorder 120 may request and retrieve the current manifest from primary recorder 110 up to time $t_2$. At this point, tertiary recorder 120 may terminate this period and start a new period with a new start time and begins recording. Primary recorder 110 is continuing its recording task. Primary recorder 110 and tertiary recorder 120 may continue to record without failure until the end of the program at time $t_{end}$.

Figure 4:
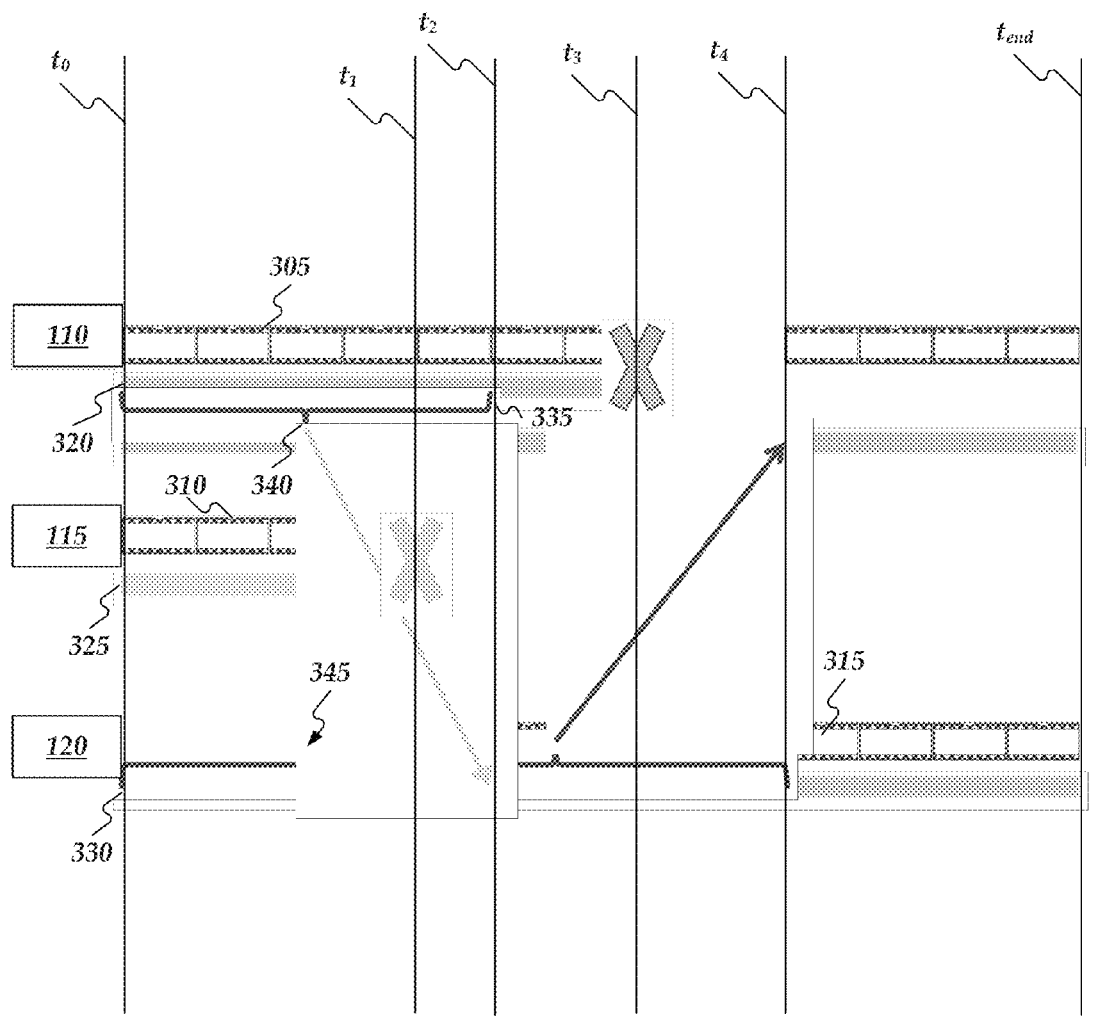
FIG. 4 shows recording failover.

FIG. 4 is a continuation of the example shown in FIG. 3 and illustrates a failure of primary recorder 110 before $t_{end}$. In this example, capture controller 125 detects primary recorder 110's failure at $t_3$, but is unable to reassign the program's recording to another recorder. In this case, after a while when primary recorder 110 restarts, the program's recording is assigned back to primary recorder 110 at $t_4$ by capture controller 125. The video recorded by primary recorder 110 remains, but primary recorder 110 discards its old manifest and retrieves an up-to-date manifest from tertiary recorder 120. The manifest retrieved from tertiary recorder 120 may refer to some of primary recorder 110's own content. This is why embodiments of the disclosure may not discard video content or indexes when the recorder restarts a recording.

From stage 210, where captive controller 125 detects and manages failover, method 200 may advance to stage 220 where captive controller 125 may deliver the manifest. For example, clients (e.g. client 140) may request the manifest from a recorder. The manifest may be identified by a URL and may be cached downstream. Any request served by any recorder should produce the same manifest. However, there may be multiple manifests generated by the recorders in the process described above. Consistent with embodiments of the disclosure, either a unique manifest may be selected (by all recorder), or multiple manifests may be reconciled into one.

Some manifests produced by the process described above may be used and some should not be used. For example, a manifest generated by a recorder that terminated recording early (e.g. secondary recorder 115 in the above example) should not be used. The manifests generated by primary recorder 110 and tertiary recorder 120 are usable and interchangeable. The manifests generated by primary recorder 110 and tertiary recorder 120 may either be prioritized or reconciled. Also, the manifest itself may be a content object that can be delivered and cached downstream. Therefore, two consecutive requests for a manifest should result in delivering the same manifest data downstream (except for changing content, where manifests are dynamic and not expected to be cached).

If capture controller 125 has a clear-cut internal prioritization between recorders, then any recorder functioning as an origin server should use the manifest generated by the recorder having the priority. This can be communicated to origin servers either using a shared database/control plane, or more simply by using a symlink in the NFS file system that points to the correct recorder subdirectory.

If a high availability (HA) architecture of capture controller 125 is designed without a clear-cut internal prioritization between recorders, but rather a pool of equal-priority recordings, then the manifest reconciliation and delivery may break into two parts: i) identifying good vs. bad manifests; and ii) ensuring all the good manifests are identical.

Regarding identifying good vs. bad manifests, a recorder may need to select manifests from complete or up-to-date recordings (e.g. primary recorder 110 and tertiary recorder 120 in the example of FIG. 3), vs. manifests from aborted/out-of-date recordings (e.g. secondary recorder 115). The simplest heuristic for this may be to look at a date-stamp of all the manifest files. The set of up-to-date manifests, for example, may be those for which the date-stamps range within one or two segment/fragment durations (e.g. 4 seconds for smooth and 20 seconds for HLS.)

Regarding ensuring all the good manifests are identical, if a recorder selects any one of multiple up-to-date manifests, they need to be identical. The only difference imposed by the HA model may be the period boundary and different BaseURL inserted during a failover. To synchronize these, first the recorder may insert a period boundary in its manifest when a recorder fails over. In the example of FIG. 3, primary recorder 110 may also insert a period boundary (e.g. period boundary 335) at the point where tertiary recorder 120 starts recording. The period boundary may contain a private meta-tag identifying the reason for the boundary (e.g. failover) and information to identify and correlate the failure between the manifests. Primary recorder 110 can get this information from tertiary recorder 120 during the failover. Synchronized clocks or counters may not be required to generate this information. When reading a manifest, for example, from a disk for delivery, BaseURL tags in the manifest may be stripped out (or sanitize) to remove recorder-specific information. This may result in manifests being identical.

Once captive controller 125 delivers the manifest in stage 220, method 200 may continue to stage 230 where captive controller 125 may perform post-processing and coalescing. For example, once program recording is complete (e.g. $t_{end}$), there may be multiple copies of video stored under the asset directory in NAS 135. Some of these multiple copies may be complete and some incomplete. While the manifests can be used to obtain any segment of video as described above, these copies may be coalesced into a single copy. The coalescing process may run offline. Additionally, the NAS storage (e.g. NAS 135) may be reliable, so there may be no value in storing more than one copy of the program on the NAS. Finally, there are efficiency considerations. The recorder may be able to do less work (and get more performance) delivering video if there were only one copy to use.

A post processing coalescing process can be performed on the video to achieve this. First, coalescing process may examine all the good manifests as described above. If any good manifest has no period boundaries inserted with a failover meta-tag, this manifest and its associated video was recorded completely by a single recorder that experienced no failure. This copy may be retained in its entirety as the primary copy for this asset (i.e. manifest, indexes, and video). All other recordings made by other recorders for this asset may be deleted and the coalescing process may terminate. This may be the mode of processing for the vast majority of recordings.

During the post processing coalescing process, if all manifests have period boundaries inserted due to failure (i.e. all recorders recording the program experienced a failure at some point), then recovery may be more complex. The following is an example algorithm for coalescing this type of asset using the double-failure example of FIG. 4. First, open all the good manifests. In this example from FIG. 4, the good manifests are from primary recorder 110 and tertiary recorder 120. The bad manifests (e.g. the manifest from secondary recorder 115) can be discarded. Next, the good manifests may be scanned down to find period boundaries caused by failure. Then all the good manifests may be analyzed to see if they all changed recorder source at the same boundary/timestamp or not. In the example of FIG. 4, the first failure-driven period boundary was inserted when primary recorder 110 took over for failed secondary recorder 115. Both primary recorder 110 and tertiary recorder 120 manifests may have a recorder-changing period boundary at that point. In this case, the algorithm may: i) select any one of the good manifests; ii) copy all the referenced video into a new asset file and indexes; iii) copy the manifest entries into the new manifest.

The second failure-driven period boundary was inserted when primary recorder 110 restarted at $t_4$ after failure. In this case, tertiary recorder 120 did not have a period boundary that shifts servers (it might have a period boundary at the failure point, but the BaseURL on both sides would point to tertiary recorder 120). Here, tertiary recorder 120 should be used as the active recorder, and the algorithm continues on until it finds another period boundary or the asset terminates. Once captive controller 125 performs post-processing and coalescing in stage 230, method 200 may then end at stage 240.

Figure 5:
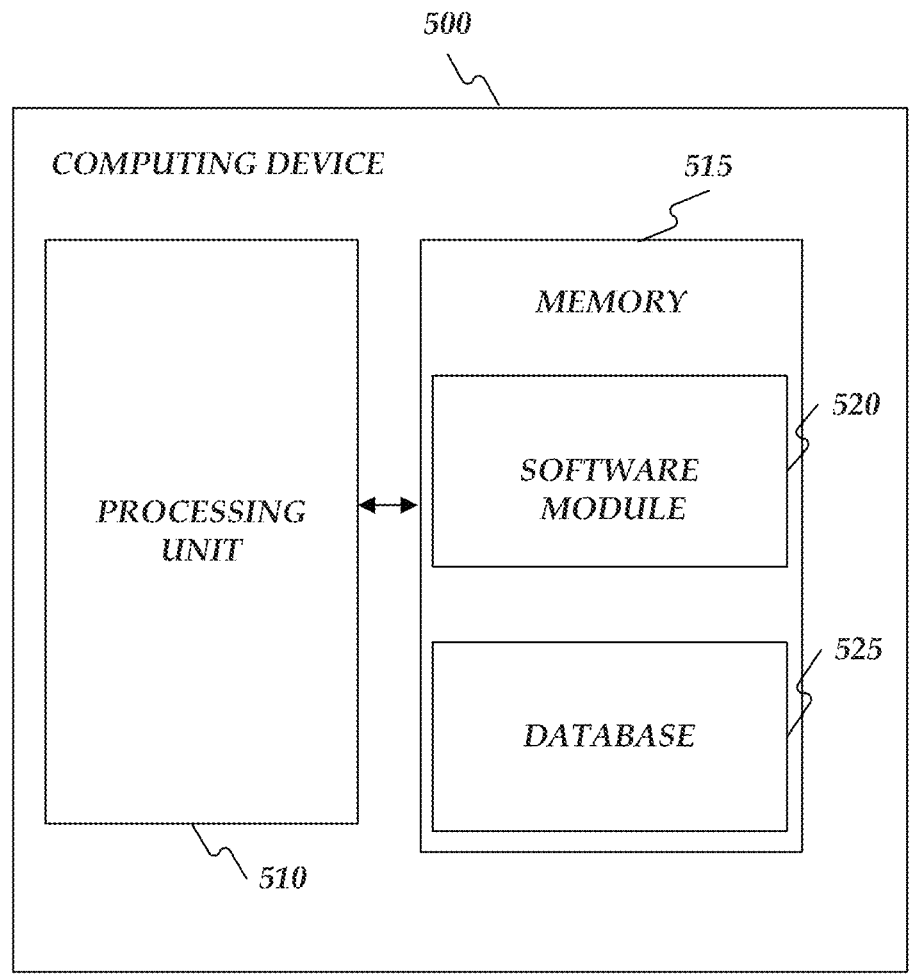
FIG. 5 shows a computing device.

FIG. 5 shows computing device 500 in more detail. As shown in FIG. 5, computing device 500 may include a processing unit 510 and a memory unit 515. Memory unit 515 may include a software module 520 and a database 525. While executing on processing unit 510, software module 520 may perform processes for combining partial recordings, including for example, any one or more of the stages from method 200 described above with respect to FIG. 2. Computing device 500, for example, may provide an operating environment for any one or more of primary recorder 110, secondary recorder 115, tertiary recorder 120, captive controller 125, content server 130, network-attached storage (NAS) 135, and client 140. Primary recorder 110, secondary recorder 115, tertiary recorder 120, captive controller 125, content server 130, network-attached storage (NAS) 135, and client 140 may operate in other environments and are not limited to computing device 500.

Computing device 500 ("the processor") may be implemented using a Wi-Fi access point, a cellular base station, a tablet device, a mobile device, a smart phone, a telephone, a remote control device, a set-top box, a digital video recorder, a cable modem, a personal computer, a network computer, a mainframe, a router, or other similar microcomputer-based device. The processor may comprise any computer operating environment, such as hand-held devices, multiprocessor systems, microprocessor-based or programmable sender electronic devices, minicomputers, mainframe computers, and the like. The processor may also be practiced in distributed computing environments where tasks are performed by remote processing devices. Furthermore, the processor may comprise, for example, a mobile terminal, such as a smart phone, a cellular telephone, a cellular telephone utilizing Wireless Application Protocol (WAP) or unlicensed mobile access (UMA), personal digital assistant (PDA), intelligent pager, portable computer, a hand held computer, a conventional telephone, or a Wireless Fidelity (Wi-Fi) access point. The aforementioned systems and devices are examples and the processor may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
    initiating a primary recorder to record a program, the primary recorder maintaining a primary recorder manifest corresponding to the primary recorder recording the program;
    initiating a secondary recorder to record the program, the secondary recorder maintaining a secondary recorder manifest corresponding to the secondary recorder recording the program;
    detecting failure of the secondary recorder; and
    initiating a tertiary recorder to record the program in response to detecting failure of the secondary recorder, the tertiary recorder maintaining a tertiary recorder manifest corresponding to the tertiary recorder recording the program wherein the tertiary recorder maintaining the tertiary recorder manifest comprises,
        receiving a copy of the primary recorder manifest covering from when the primary recorder began to record the program to when the tertiary recorder began to record the program, and
        prepending the received copy of the primary recorder manifest to the tertiary recorder manifest.

2. The method of claim 1, further comprising:
    using the content recorded by the primary recorder for playout by the tertiary recorder based on the prepended manifest; and
    delivering the combined manifest and individual chunks of video to clients from one of the following: the primary recorder and the tertiary recorder.

3. The method of claim 1, further comprising:
    detecting failure of the primary recorder; and
    detecting restart of the primary recorder, the primary recorder maintaining a new primary recorder manifest corresponding to the primary recorder recording the program wherein the primary recorder maintaining the new primary recorder manifest comprises,
        receiving a copy of the tertiary recorder manifest, and
        prepending the received copy of the tertiary recorder manifest to the new primary recorder manifest.

4. The method of claim 1, further comprising delivering one of the primary recorder manifest and the tertiary recorder manifest.

5. The method of claim 4, further comprising reconciling the primary recorder manifest and the tertiary recorder manifest.

6. The method of claim 4, wherein delivering one of the primary recorder manifest and the tertiary recorder manifest comprises delivering one of the primary recorder manifest and the tertiary recorder manifest based upon which one of the primary recorder and the tertiary recorder has a higher priority.

7. The method of claim 1, further comprising coalescing multiple copies of segments corresponding to the program to a single copy.

8. The method of claim 1, further comprising initiating the primary recorder to record the program and the secondary recorder to record the program substantially simultaneously.

9. The method of claim 1, wherein the primary recorder, the secondary recorder, and the tertiary recorder are initiated by a capture controller.

10. The method of claim 1, wherein the primary recorder, the secondary recorder, and the tertiary recorder record segments corresponding to the program on storage shared by the primary recorder, the secondary recorder, and the tertiary recorder.

11. The method of claim 1, wherein the primary recorder, the secondary recorder, and the tertiary recorder record segments corresponding to the program on storage shared by the primary recorder, the secondary recorder, and the tertiary recorder wherein the storage shared by the primary recorder, the secondary recorder, and the tertiary recorder comprises a network-attached storage (NAS).

12. The method of claim 1, wherein the primary recorder, the secondary recorder, and the tertiary recorder record segments corresponding to the program on storage not shared by the primary recorder, the secondary recorder, and the tertiary recorder.

13. The method of claim 1, further comprising stopping the primary recorder and the tertiary recorder substantially simultaneously at the end of the program.

14. The method of claim 1, further comprising inserting a period boundary in the primary recorder manifest at a time when the tertiary recorder begins recording the program.

15. The method of claim 14, further comprising using the period boundary in reconciling the primary recorder manifest and the tertiary recorder manifest.

16. An apparatus comprising:
 a memory storage; and
 a processing unit coupled to the memory storage, wherein the processing unit is operative to:
  record a program in response to a failure of a secondary recorder; and
  maintain a tertiary recorder manifest wherein the processing unit being operative to maintain the tertiary recorder manifest comprises the processing unit being operative to,
   receive a copy of a primary recorder manifest covering from when the primary recorder began to record the program to when the processing unit began to record the program, and
   prepend the received copy of the primary recorder manifest to the tertiary recorder manifest.

17. The apparatus of claim 16, wherein a capture controller notifies the processing unit of the failure of the secondary recorder.

18. The apparatus of claim 16, wherein the primary recorder and the processing unit record segments corresponding to the program on storage shared by the primary recorder and the processing unit.

19. The apparatus of claim 16, wherein the primary recorder and the processing unit record segments corresponding to the program on storage shared by the primary recorder and the processing unit wherein the storage shared by the primary recorder and the processing unit comprises a network-attached storage (NAS).

20. A method comprising:
 detecting, by a capture controller, failure of a secondary recorder;
 initiating, by the capture controller, a tertiary recorder to record a program in response to detecting failure of the secondary recorder, the tertiary recorder maintaining a tertiary recorder manifest corresponding to the tertiary recorder recording the program wherein the tertiary recorder maintaining the tertiary recorder manifest comprises,
  receiving a copy of a primary recorder manifest covering from when the primary recorder began to record the program to when the tertiary recorder began to record the program, and
  prepending the received copy of the primary recorder manifest to the tertiary recorder manifest.

21. The method of claim 20, further comprising:
 detecting, by the capture controller, failure of the primary recorder; and
 detecting, by the capture controller, restart of the primary recorder, the primary recorder maintaining a new primary recorder manifest corresponding to the primary recorder recording the program wherein the primary recorder maintaining the new primary recorder manifest comprises,
  receiving a copy of the tertiary recorder manifest, and
  prepending the received copy of the tertiary recorder manifest to the new primary recorder manifest.

22. The method of claim 21, further comprising initiating the primary recorder to record the program, the primary recorder maintaining the primary recorder manifest corresponding to the primary recorder recording the program.

23. The method of claim 22, further comprising initiating the secondary recorder to record the program, the secondary recorder maintaining a secondary recorder manifest corresponding to the secondary recorder recording the program.

24. The method of claim 23, further comprising initiating the primary recorder to record the program and the secondary recorder to record the program substantially simultaneously.

* * * * *